United States Patent
Nishiki (10) Patent No.: US 7,224,902 B2
(45) Date of Patent: May 29, 2007

(54) OPTICAL ENCODING METHOD AND ENCODER FOR OPTICAL CODE DIVISION MULTIPLEXING

(75) Inventor: Akihiko Nishiki, Tokyo (JP)

(73) Assignee: OKI Electric Industry Co., Ltd., Tokyo (JP)

( * ) Notice: Subject to any disclaimer, the term of this patent is extended or adjusted under 35 U.S.C. 154(b) by 750 days.

(21) Appl. No.: 10/253,599

(22) Filed: Sep. 25, 2002

(65) Prior Publication Data

US 2003/0156847 A1   Aug. 21, 2003

(30) Foreign Application Priority Data

Feb. 15, 2002   (JP) .............. 2002-037520

(51) Int. Cl.
*H04J 14/02*   (2006.01)
*H04J 14/08*   (2006.01)

(52) U.S. Cl. ................ 398/87; 398/84; 398/102; 398/82

(58) Field of Classification Search .......... 398/77, 398/78, 102, 84, 87, 82, 183, 201, 161, 101
See application file for complete search history.

(56) References Cited

U.S. PATENT DOCUMENTS

| | | | | |
|---|---|---|---|---|
| 5,995,255 | A * | 11/1999 | Giles | 398/34 |
| 2002/0012500 | A1 * | 1/2002 | Paek | 385/37 |
| 2003/0086647 | A1 * | 5/2003 | Willner et al. | 385/37 |
| 2004/0175188 | A1 * | 9/2004 | Bellemare et al. | 398/186 |

FOREIGN PATENT DOCUMENTS

JP   2000-209186   7/2000

OTHER PUBLICATIONS

N. Wada et al., "Time-spread/wavelength-hop OCDM using fibre Bragg grating with supercontinuum light source," 1999 IEICE Communication Society Conference, B-10-128, p. 305.

Lawrence R. Chen et al., "Wavelength-Encoding/Temporal-Spreading Optical code Division Multiple-Access System With In-Fiber Chirped Moiré Gratings", Applied Optics, OSA, Optical Society of America, Washington, DC, US, vol. 38, No. 21, Jul. 20, 1999, pp. 4500-4508.

(Continued)

*Primary Examiner*—Dalzid Singh
(74) *Attorney, Agent, or Firm*—Wenderoth, Lind & Ponack, L.L.P.

(57) ABSTRACT

A time-spreading and wavelength-hopping optical encoder spreads each pulse in a modulated optical pulse signal into a predetermined pulse train including pulses with different wavelengths. The last pulse in the pulse train is delayed from the first pulse in the pulse train by an interval that is longer than the pulse period of the modulated optical pulse signal. Interference is avoided by dividing the pulse train into successive delay groups that are equal in length to the pulse period of the modulated data pulse signal, and having each wavelength appear in only one delay group. If encoders producing differently structured pulse trains are used in an optical multiplexer, interference is avoided by having the same wavelength appear only at different positions within the delay groups of different pulse trains. Long delays can be used to multiplex a relatively large number of channels, even at high transmission rates.

11 Claims, 8 Drawing Sheets

OTHER PUBLICATIONS

Wei Huang et al., "Coherent Optical CDMA (OCDMA) Systems Used for High-Capacity Optical Fiber Networks-System Description, OTDMA Comparison, and OCDMA/WDMA Networking", Journal of Lightwave Technology, IEEE Service Center, New York, NY, US, vol. 18, No. 6, Jun. 2000, pp. 765-778.

Lawrence R. Chen et al., "Proof-of-Principle Demonstration of a Wavelength-Encoding/Time-Spreading Optical Code-Division Multiple Access System using In-Fiber Chirped Moiré Gratings", Conference on Lasers and Electro-Optics, (CLEO 2000), Technical Digest, Postconference Edition, San Francisco, CA, May 7-12, 2000, Trends in Optics and Photonics (TOPS), New York, NY, IEEE, US, vol. 39, May 7, 2000. pp. 577-578.

L. Tančevski et al., "Hybrid Wavelength Hopping/Time Spreading Schemes for Use in Massive Optical Networks With Increased Security", Journal of Lightwave Technology, IEEE Service Center, New York, NY, US, vol. 17, No. 12, Dec. 1996, pp. 2636-2647.

* cited by examiner

1ST CODE: $\lambda_1$0000000000 $\lambda_2$00000000 $\lambda_3$000000000 $\lambda_4$000000000

2ND CODE: 00 $\lambda_3$00000000 $\lambda_1$00000000000000 $\lambda_4$000 $\lambda_2$000000000

OPTICAL ENCODING METHOD AND ENCODER FOR OPTICAL CODE DIVISION MULTIPLEXING

BACKGROUND OF THE INVENTION

1. Field of the Invention

The present invention relates to an optical encoding method and optical encoder for use in optical communication. More particularly, the present invention relates to optical encoding using a time-spreading wavelength-hopping code.

2. Description of the Related Art

Optical multiplexing raises the capacity of optical communication systems by enabling a single transmission path to carry a plurality of communication channels. Various optical multiplexing methods have been developed, starting with time division multiplexing and proceeding to wavelength division multiplexing, which provides more communication capacity. Even higher communication capacities are expected to be achievable by optical code division multiplexing (OCDM), which permits a plurality of communication channels to share the same time slot and the same wavelength group.

A nine-chip, three-wavelength optical encoder using a time-spreading wavelength-hopping code for OCDM and employing chirped fiber Bragg gratings (CFBGs) is disclosed in, for example, Japanese Unexamined Patent Application Publication No. 2000-209186.

Encoders of this type were used in a transmission experiment described in a paper by Naoya Wada, Hideyuki Sotobayashi, and Ken-ichi Kitayama entitled "Time-spread/wavelength-hop OCDM using fiber Bragg grating with supercontinuum light source", 1999 IEICE Communication Society Conference, B-10-128. The data transmission rate in this experiment was 2.5 gigabits per second (Gbps). This rate and the disclosed dispersion characteristics indicate that the optical encoders were forty millimeters (40 mm) long and used CFBGs substantially 9 mm in length.

Figure 10A:
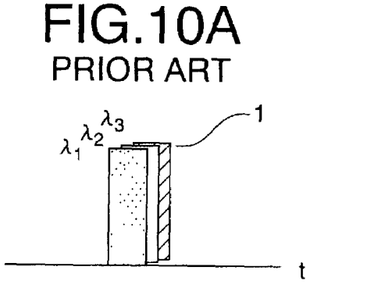
FIGS. 10A, 10B, 10C, and 10D illustrate the encoding of a signal in a conventional optical multiplexing method.
Figure 10B:
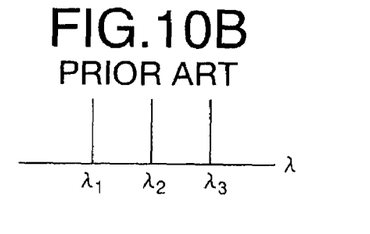
Figure 10C:
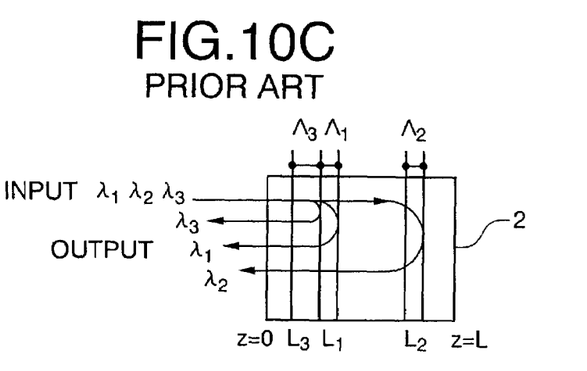
Figure 10D:
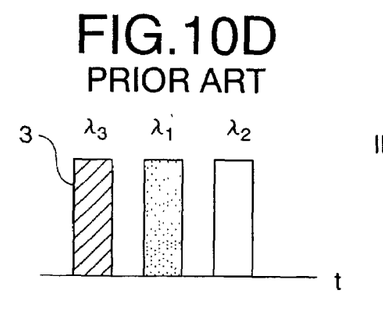

In the encoding process described in these documents, a wideband light pulse 1 (FIG. 10A) including wavelengths $\lambda_1$, $\lambda_2$, and $\lambda_3$ (FIG. 10B) is input to an optical encoder 2 (FIG. 10C). The optical encoder 2 is an optical fiber of length L having three internal CFBGs with grating pitches $\Lambda_1$, $\Lambda_2$, $\Lambda_3$ respectively disposed at positions $L_1$, $L_2$, $L_3$ on the longitudinal fiber axis or z-axis. Three reflected optical pulses with different wavelengths $\lambda_1$, $\lambda_2$, $\lambda_3$ and different delays are output from the optical encoder 2 for transmission to a distant decoder. Viewed on the time axis (t), a single input pulse 1 (FIG. 10A) has been converted to an optical pulse train 3 (FIG. 10D) including separate pulses with wavelengths $\lambda_1$, $\lambda_2$, $\lambda_3$. The nine chips refer to nine positions on the time axis at which the three pulses with wavelengths $\lambda_1$, $\lambda_2$, $\lambda_3$ may occur.

Figure 10E:
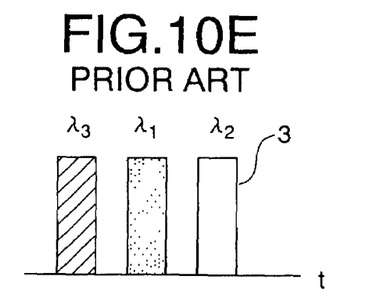
FIGS. 10E, 10F, 10G, and 10H illustrate the decoding of a signal in the conventional optical multiplexing method.
Figure 10F:
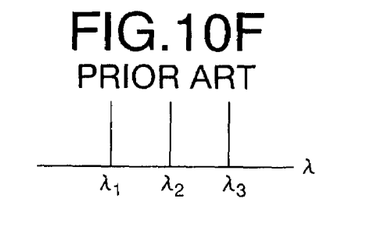
Figure 10G:
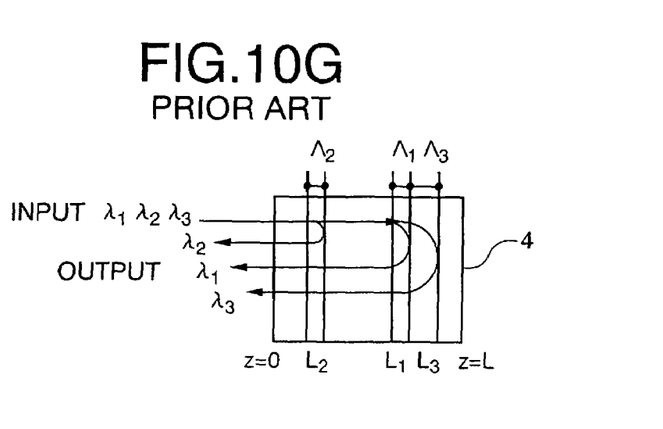
Figure 10H:
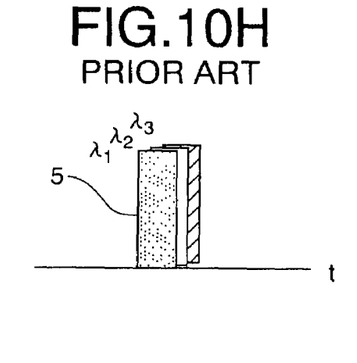

In the decoding process, the optical pulse train 3 (FIG. 10E) including wavelengths $\lambda_1$, $\lambda_2$, $\lambda_3$ (FIG. 10F) is directed into an optical decoder 4 (FIG. 10G) having CFBGs positioned in a mirror-image relationship to the positions of the CFBGs in the optical encoder 2. The pulses are thus reflected with delays that compensate for the delays produced in the optical encoder 2, so that the optical pulse train 3 is restored to a single optical pulse 5 (FIG. 10H) in which the $\lambda_1$, $\lambda_2$, and $\lambda_3$ wavelength components have the same timing.

The optical encoder 2 functions as a high-precision time-spreading, wavelength-hopping control element. Incidentally, wavelength hopping is also referred to as frequency hopping, and optical code division multiplexing is also referred to as optical code division multiple access (OCDMA).

The optical encoder 2 used in the prior art described above produces relative delays shorter than the input pulse period, so that the encoded pulse trains do not overlap. While this non-overlapping condition prevents interference, it also limits the data transmission rate. An optical encoder 2 with a total length of 40 mm, for example, is limited to a maximum data rate of 2.5 Gbps.

The number of codes available for multiplexing is also limited. One reason is the limited number of chips into which each input pulse period can be divided, since the chip interval cannot be shorter than the input pulse width. Another reason is that to obtain the necessary spectral shape, the CFBGs used in the optical encoder must have lengths from substantially 2 mm to 10 mm. Since adjacent CFBGs must be physically separate, if the chip interval is reduced to provide more chips, the pulses in the encoded pulse train must be separated by an increasing numbers of chips. This requirement constrains the pulse-train structure so that the shortened chip interval fails to produce a matching increase in the number of codes. A further restriction is that when different optical signals are multiplexed by the use of different optical codes, to avoid inter-code interference, no two codes may have the same wavelength element located at the same chip position.

If each encoder produces only delays shorter than the input pulse period, there is accordingly a tradeoff between the data transmission rate and the number of channels that can be multiplexed. As the data transmission rate increases and the input pulse period is reduced, the maximum code length (number of chips) is reduced, and the number of codes available for multiplexing becomes highly restricted. In the examples of the prior art described above, in which three wavelength elements are spread over nine chips on the time axis but cannot occupy adjacent chip positions, a maximum of six channels can be multiplexed.

SUMMARY OF THE INVENTION

A general object of the present invention is to increase the number of optical communication channels that can be multiplexed at a given data transmission rate.

Another object is to increase the data transmission rate at which a given number of optical communication channels can be multiplexed.

A more specific object is to increase the number of effective codes available in a time-spreading and wavelength-hopping optical encoding system.

The optical encoding method and optical encoder of the present invention encode a modulated optical pulse signal having a predetermined pulse rate by spreading each pulse into a train of pulses with different delays and wavelengths. The last pulse in the pulse train is delayed from the first pulse in the pulse train by an amount exceeding the pulse period (the reciprocal of the pulse rate) of the modulated optical pulse signal.

The pulse train can be considered to be divided into successive time intervals, referred to below as delay groups, equal in length to the pulse period of the modulated optical pulse signal. The first delay group typically includes the first pulse in the pulse train. Other delay groups may include zero, one, or more than one pulse. Any two pulses in different delay groups preferably have different wavelengths. For example, all of the pulses in the pulse train may have different wavelengths.

A pulse of a given wavelength occurring at a given position in the pulse train will also be referred to as a wavelength element of the time-spreading and wavelength-hopping code. The part of the pulse train disposed in one delay group will also be referred to as a code element. The structure of the entire pulse train constitutes the code.

Each delay group may be further divided into uniform intervals or chips, where each chip preferably has a length equal to or greater than the pulse width of the input modulated optical signal pulses. Each wavelength element occupies one chip position. When different modulated optical pulse signals are multiplexed by encoding them with different codes and combining the encoded signals, if the same wavelength appears in delay groups of different codes, it preferably occupies different chip positions in those delay groups, thereby avoiding interference between the signals encoded by the different codes.

The optical encoder of the present invention preferably includes a plurality of chirped fiber Bragg gratings disposed in an optical fiber.

The delay from the first wavelength element to the last wavelength element in the code may have any value which is greater than the pulse period of the modulated optical pulse signal. Accordingly, there is no upper limit to the length of the code or the number of its wavelength elements, and the number of codes available for multiplexing is not limited by the requirement for physical non-overlap of the chirped fiber Bragg gratings.

DETAILED DESCRIPTION OF THE INVENTION

Embodiments of the invention will now be described with reference to the attached drawings, in which like elements are indicated by like reference characters.

To increase the number of codes available for multiplexing, the present invention allows each optical input pulse to be spread to a pulse train or code of an arbitrary length, structured so as to avoid interference even if different codes overlap. This is accomplished by adherence to the following coding rules.

(1) The optical encoder may produce delays up to an arbitrary multiple (3.9 in the embodiments below) of the input pulse period. The maximum delay actually produced is longer than the input pulse period.

(2) The arbitrary multiple of the input pulse period is divided into a plurality of delay groups, where each delay group is equal in length to the input pulse period.

(3) A single delay group is divided into uniform intervals or chips having a length equal to or greater than the pulse width of the input modulated optical pulse signal. The total number of chips in the code is accordingly the number of delay groups multiplied by the number of chips per delay group.

(4) Wavelength elements with wavelengths selected from a group of wavelengths are disposed at selected chips in the delay groups. The locations of the wavelength elements determine the code built into the optical encoder. It is not necessary for every delay group to include a wavelength element.

The number of wavelengths that may be assigned to a single delay group is limited as follows.

a. The relationship between the length of the delay group and lengths of the CFBGs limits the number of wavelength elements per delay group. Within this limitation, a plurality of wavelengths (frequencies) can be assigned to a single delay group.

b. The CFBGs must be positioned so that a CFBG in one delay group does not overlap a CFBG in the following delay group.

(5) The sets of wavelengths appearing in the delay groups must be mutually exclusive. All wavelength elements in the same code must therefore have different wavelengths.

(6) When optical codes are multiplexed by use of a plurality of optical encoders, if wavelength elements with the same wavelength occur in two optical encoders, the two wavelength elements must not occupy the same chip position in their respective delay groups. (This coding rule does not apply to the first embodiment, but will appear in the second embodiment described below).

First Embodiment

Figure 1:
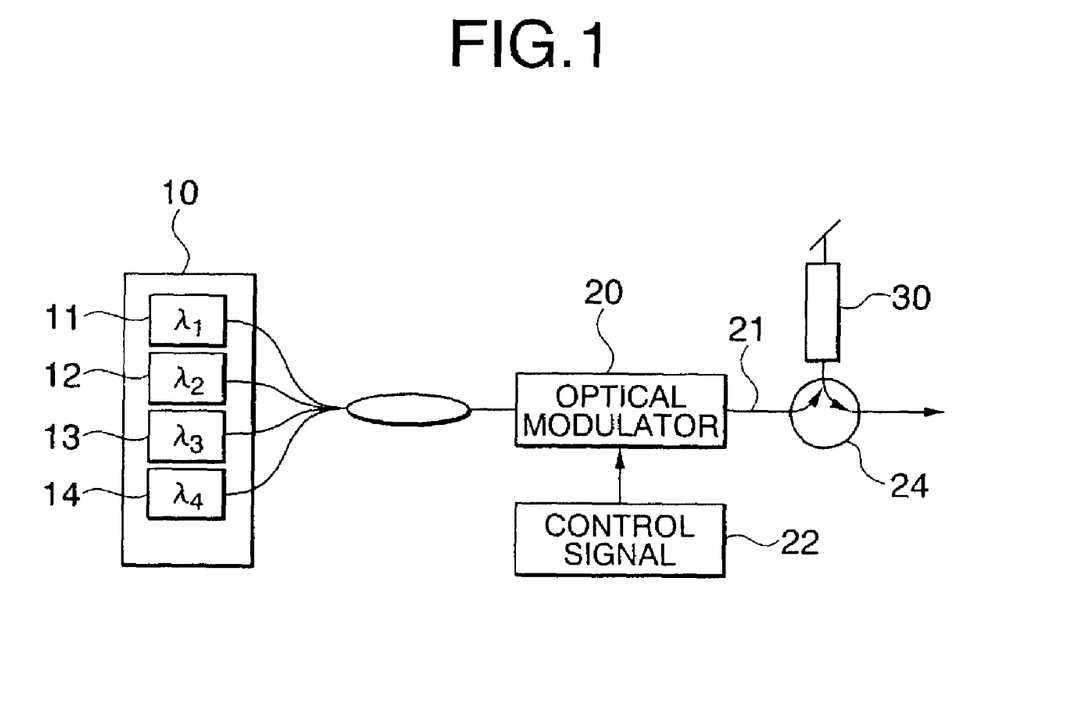
FIG. 1 shows the structure of an optical encoding system according to a first embodiment of the invention.

FIG. 1 shows the structure of an optical encoding system in which coding rules (1)–(5) are applied. The system employs a multiple-wavelength light source 10 including individual light sources 11, 12, 13, 14 that supply light of respective wavelengths $\lambda_1, \lambda_2, \lambda_3, \lambda_4$ to an optical modulator 20, which operates according to a control signal 22. The optical encoding system also includes an optical circulator 24 and an optical encoder 30. The wavelengths $\lambda_1, \lambda_2, \lambda_3, \lambda_4$ of the light sources 11–14 correspond to the center reflection wavelengths of CFBGs (described below) in the optical encoder 30.

In the first embodiment, the data transmission rate is 10 Gbps. The wavelengths $\lambda_1, \lambda_2, \lambda_3$, and $\lambda_4$, output from the light sources 11–14 are combined, and the combined signal is input to the optical modulator 20. The optical modulator 20 modulates the combined signal according to the control signal 22, thereby generating a data signal 21, which is an arbitrary digital pulse signal with a pulse width equivalent to the chip interval or chip time in the optical encoder 30.

Figure 2:
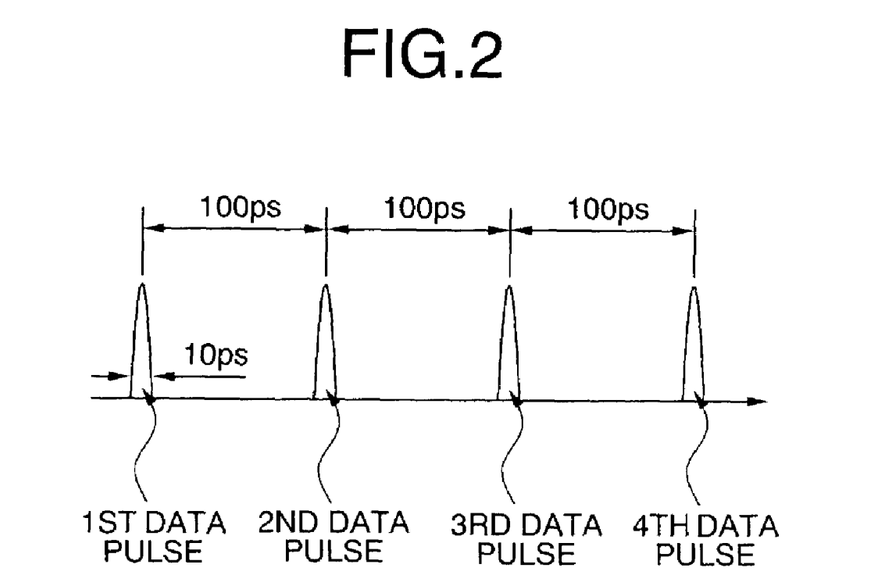
FIG. 2 shows a sequence of data pulses prior to encoding.

FIG. 2 shows a sequence of four data pulses in the data signal 21 prior to encoding. The data signal 21 is generated as a multi-wavelength return-to-zero (RZ) signal with a pulse width of ten picoseconds (10 ps) and a pulse period of 100 ps. The sequence of data pulses shown in FIG. 2 corresponds to all '1' data (1, 1, 1, 1). The data signal 21 enters the optical encoder 30 through the optical circulator 24, is encoded, and exits through the optical circulator 24.

Figure 3:
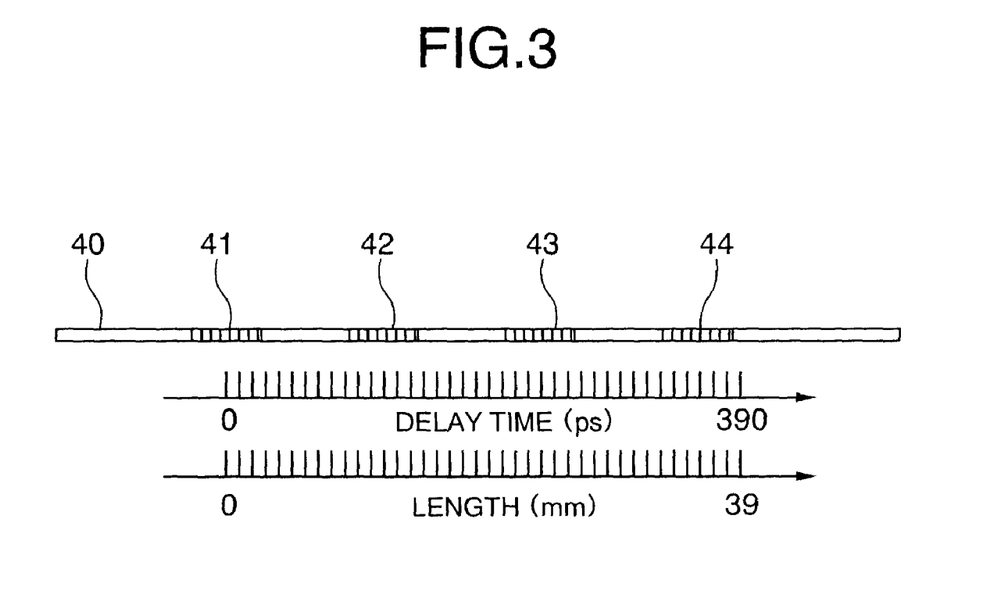
FIG. 3 illustrates relationships between the internal structure of the optical encoder in FIG. 1, maximum delay, and grating length.

FIG. 3 illustrates relationships between the internal structure of the optical encoder 30, the maximum delay, and the grating length for a data transmission rate of 10 Gbps. The optical encoder 30 comprises an optical fiber 40 having CFBGs 41, 42, 43, and 44 with respective grating lengths of 5 mm. The maximum length of the region in which the CFBGs are formed is 44.0 mm. The maximum delay from the first pulse, reflected by the first CFBG 41, to the fourth pulse, reflected by the fourth CFBG 44, is 390 ps.

Figure 4:
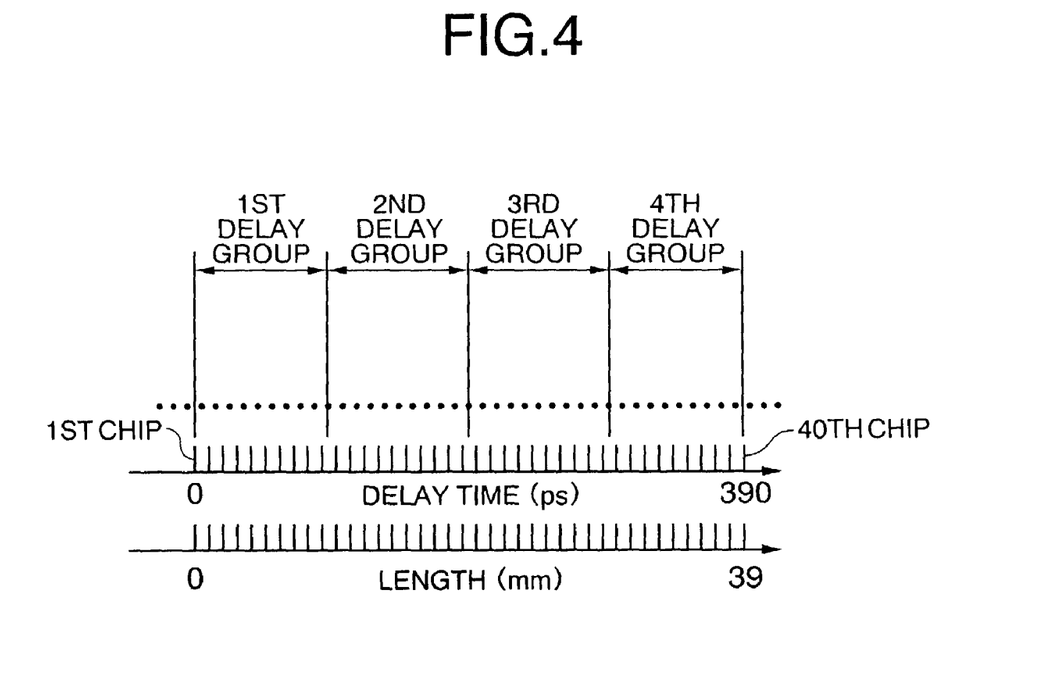
FIG. 4 illustrates delay groups within the maximum delay.

FIG. 4 illustrates the delay groups in the first embodiment. As noted above, the data transmission rate is 10 Gbps, the data pulse period is 100 ps, and the optical encoder 30 is capable of producing relative delays up to 390 ps, which is 3.9 times the input pulse period (cf. coding rule (1)). The maximum delay of 390 ps corresponds to a distance of 39.0 mm from the center of the first CFBG to the center of the last CFBG. The maximum delay of 390 ps is divided into 100-ps units to form a first delay group, a second delay group, a third delay group, and a fourth delay group (cf. coding rule (2)). Each delay group is divided into ten equal chip intervals (cf. coding rule (3)). Each chip is 10 ps long, equal to the optical pulse width of the data pulses in the input modulated optical signal, and to 1 mm of the length of the optical encoder 30. The code has a total length of forty chips, which is four times the ten-chip length of each delay group.

A single wavelength element (a single CFBG) may be located at an arbitrary chip in a delay group (cf. coding rule (4)). Since the length of the CFBG used in the first embodiment is 5 mm, no wavelength element (CFBG) can be closer than five chips (5 mm) to the preceding or following wavelength element. Each delay group may therefore have zero, one, or two wavelength elements, but in this encoder 30, wavelength elements with wavelengths $\lambda_1$, $\lambda_2$, $\lambda_3$, and $\lambda_4$ are disposed in the first delay group, second delay group, third delay group, and fourth delay respectively (cf. coding rule (5)).

When used for C-band communication as designated by the International Telecommunications Union (ITU), with thirty-two wavelengths at a 100-GHz channel spacing, the optical encoder 30 in the first embodiment can multiplex eight channels onto four wavelengths.

Figure 5A:
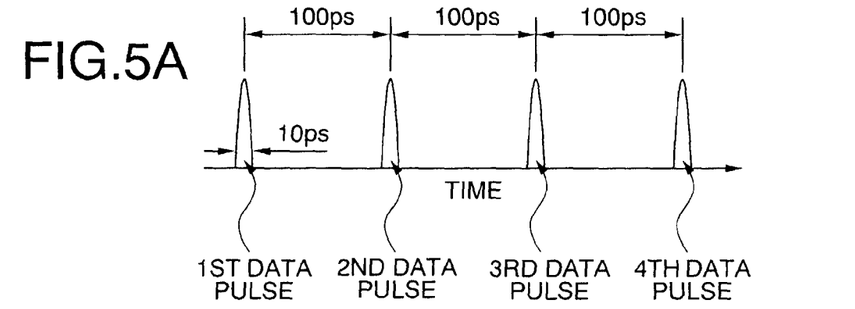
FIG. 5A shows a sequence of data pulses prior to encoding.
Figure 5B:
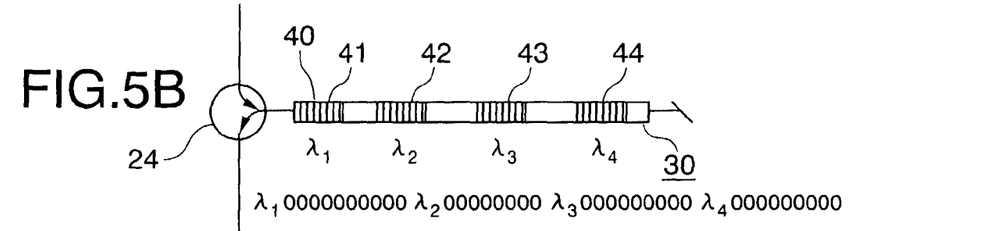
FIG. 5B shows the internal structure of the optical encoder in FIG. 1.
Figure 5C:
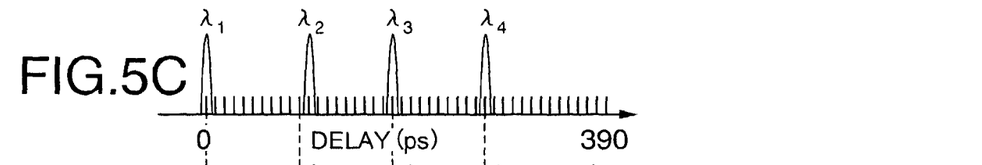
FIGS. 5C, 5D, 5E, and 5F illustrate the encoding of the data pulses in FIG. 5A.
Figure 5D:
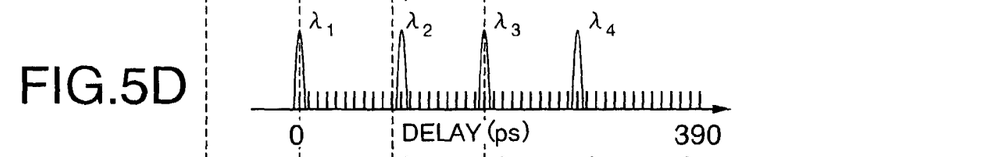
Figure 5E:
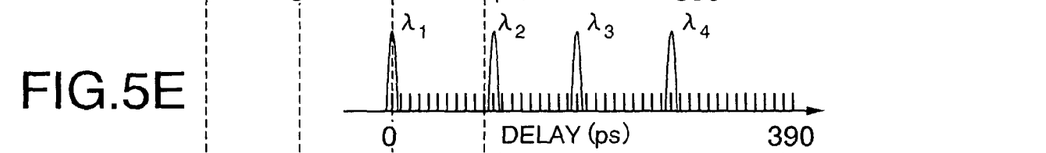
Figure 5F:
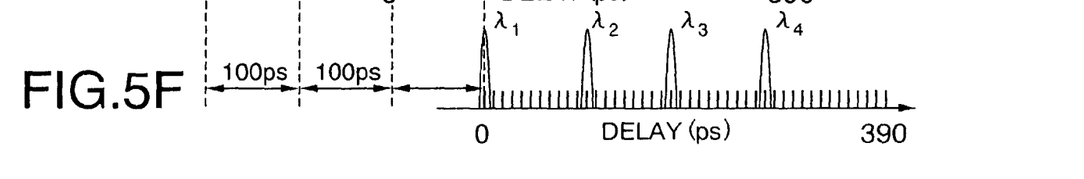

FIG. 5A shows a sequence of data pulses in the data signal 21 prior to encoding, FIG. 5B shows the internal structure of the optical encoder 30, and FIGS. 5C, 5D, 5E, and 5F illustrate the encoding of the data pulses in FIG. 5A. In FIG. 5B, ($\lambda_1$000000000), (0$\lambda_2$00000000), ($\lambda_3$000000000), and ($\lambda_4$000000000), respectively indicate the optical code elements constituting the first delay group, the second delay group, the third delay group, and the fourth delay group.

The data signal 21 in FIG. 5A is a digital signal in which light (of wavelengths $\lambda_1$, $\lambda_2$, $\lambda_3$, and $\lambda_4$) output from the light sources 11–14 has been combined and modulated at a rate of 10 GHz in the optical modulator 20, with a control resolution equivalent to the chip interval. When this data signal 21 is input to the optical fiber 40 in the optical encoder 30 shown in FIG. 5B, the different wavelengths in the data signal 21 are reflected with different delays, corresponding to the positions of the CFBGs 41, 42, 43, and 44, thereby encoding each data pulse as a train of four optical pulses with different wavelengths.

Although the original data signal (the data signal 21) is a modulated optical pulse signal with a 100-ps pulse period (FIG. 5A), the pulses in the encoded pulse train may be spread out over an interval with a maximum length of 390 ps. Accordingly, different optical codes encoded by the optical encoder 30 overlap when transmitted. Nevertheless, the original data signal (the data signal 21) is recoverable by an optical decoder at the receiving end.

Figure 6:
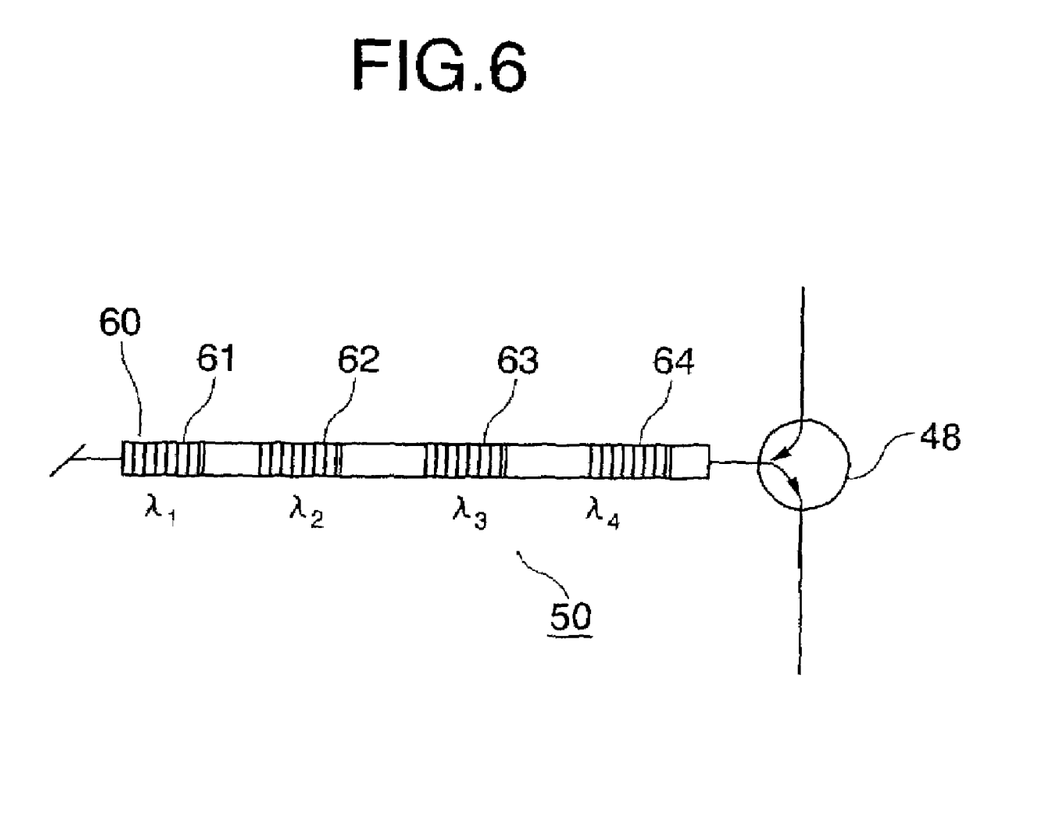
FIG. 6 shows the internal structure of an optical decoder used in the first embodiment.

FIG. 6 shows the internal structure of the optical decoder used in the first embodiment. The optical decoder 50 includes an optical fiber 60 having four CFBGS 61, 62, 63, 64 providing wavelength elements identical to the wavelength elements provided by the CFBGs in the optical encoder 30, but the CFBGs in the optical decoder 50 are in mirror-image positions with respect to the CFBGs in the optical encoder 30. When a modulated optical pulse signal that is encoded according to the first embodiment as described above is input to the optical decoder 50 through an optical circulator 48, because of the mirror-image positional relationship between the CFBGs in the optical decoder 50 and those in the optical encoder 30, the optical decoder 50 produces delays that compensate for the delays produced in the optical encoder 30, thereby generating an optical signal in which the different wavelengths in each data pulse are aligned at the same timing. That is, each encoded pulse train is reassembled into a single data pulse. These data pulses can be detected by comparison with a suitable threshold value to recover the original data signal 21 shown in FIG. 5A.

If the encoded optical pulse signal is input to an optical decoder with wavelength elements differing from the wavelength elements of the optical encoder 30 (the CFBGs in the optical decoder are not in a mirror-image positional relationship to the CFBGs in the optical encoder 30), the wavelength delays produced in the optical decoder will not compensate for the delays produced in the optical encoder 30, so the encoded pulse train will fail to be reassembled into a single data pulse, and the output signal will remain below the suitable detection threshold value.

In the first embodiment, as described above, since the optical encoder 30 is capable of producing delays up to an arbitrary multiple of the input pulse period of the modulated optical pulse signal, and the maximum delay interval is divided into delay groups, different wavelength elements may be located at arbitrary chips in different delay groups. Even though successive encoded pulse trains may overlap, the optical pulses will be correctly reassembled by the optical decoder 50, so interference is avoided and final thresholding determinations can be performed easily and reliably.

Since the relative delays produced in the optical encoder are not limited to values less than the data pulse period, the number of codes that can be produced using a given number of wavelengths and a given chip spacing is much less restricted than in the prior art.

Second Embodiment

In the first embodiment described above, although different encoded pulse trains (optical codes) output from the same optical encoder may overlap, interference is avoided because each pulse train is reassembled into a single pulse in the optical decoder. When the signals output from different optical encoders are multiplexed, however, further steps must be taken to ensure that pulse trains from different encoders do not interfere. In the second embodiment, two optical encoders are used and coding rule (6) is applied in addition to coding rules (1)–(5).

Figure 7:
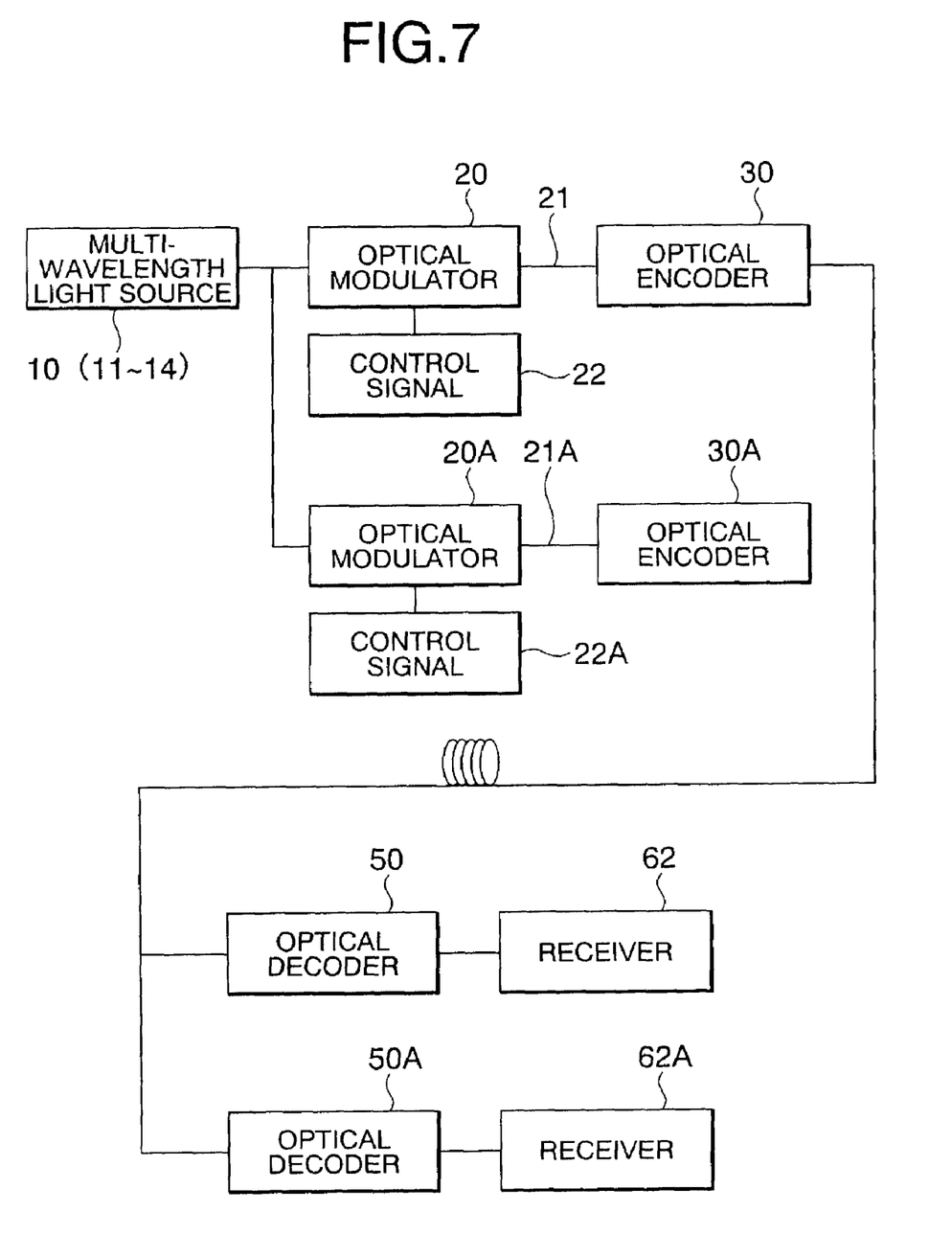
FIG. 7 shows the structure of an optical encoding system according to a second embodiment of the invention.

FIG. 7 shows the structure of an optical encoding system according to the second embodiment of the invention, omitting the optical circulators for simplicity. The system in the second embodiment includes the multiple-wavelength light source 10, optical modulator 20, and optical encoder 30 of the first embodiment and another similar optical modulator 20A and optical encoder 30A. Optical modulator 20 operates according to a control signal 22, and optical modulator 20A operates according to a different control signal 22A. The signals output from the two optical encoders 30, 30A are combined for multiplexed transmission to a pair of optical decoders 50, 50A that furnish decoded optical signals to respective receivers 62, 62A.

FIGS. 8A, 8B, 8C, and 8D illustrate the encoding of four consecutive data pulses by the optical encoder 30 in FIG. 7. As in the first embodiment, the code elements in the first delay group, second delay group, third delay group, and fourth delay group are $(\lambda_1 000000000)$, $(0\lambda_2 00000000)$, $(\lambda_3 000000000)$, and $(\lambda_4 4000000000)$, respectively. In the optical encoder 30A, the optical code elements in the four delay groups are $(00_{\lambda_3}0000000)$, $(0\lambda_1 00000000)$, $(000000\lambda_4 000)$, and $(\lambda_2 000000000)$.

The $\lambda_1$ wavelength element occurs at the first chip in the first delay group in the optical encoder 30, and at the second chip in the second delay group in the optical encoder 30A, thus occupying different chips in the two delay groups. Similarly, the $\lambda_2$ wavelength element occurs at the second chip in the second delay group in the optical encoder 30 and at the first chip in the fourth delay group in the optical encoder 30A, thus occupying different chips in the two delay groups. The $\lambda_3$ and $\lambda_4$ wavelength elements likewise occupy different chips in their respective delay groups in the optical encoders 30 and 30A. The optical encoders 30 and 30A thus comply with coding rule (6): in no case does the same wavelength element occur at the same chip position within delay groups in the two codes generated by the two encoders.

Figure 8A:
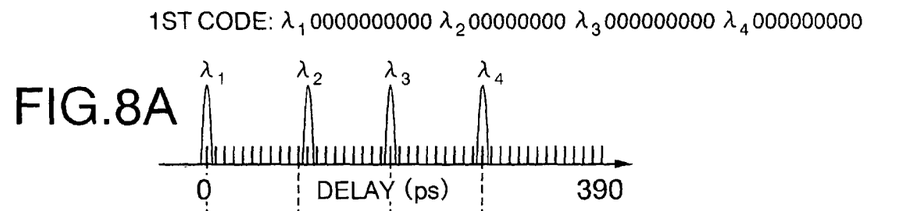
FIGS. 8A, 8B, 8C, and 8D illustrate the encoding of data pulses by one optical encoder in FIG. 7.
Figure 8B:
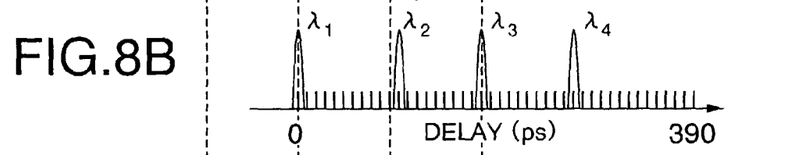
Figure 8C:
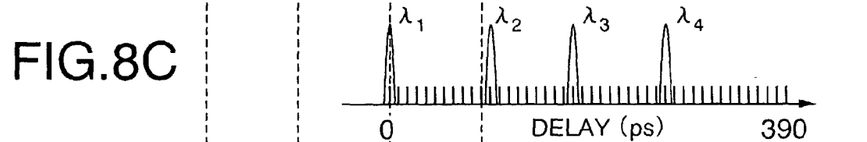
Figure 8D:
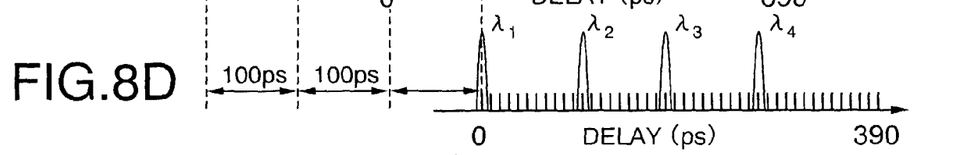
Figure 8E:
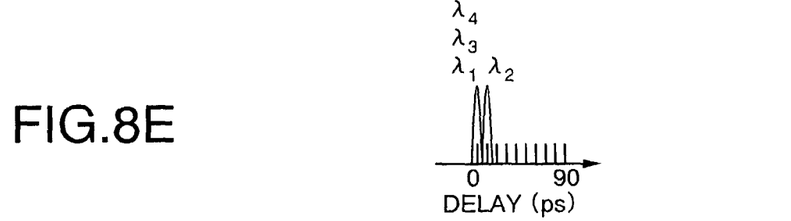
FIG. 8E shows overlapping codes in the output from this optical encoder.

The optical encoder 30 converts four successive '1' pulses in the data signal 21 from the optical modulator 20 to encoded pulse trains that are delayed by successive amounts equal to the pulse period of the data signal 21, overlapping as shown in FIGS. 8A, 8B, 8C, and 8D. In the signal output from the optical encoder 30, a single delay group may thus include wavelength elements of all four wavelengths $\lambda_1$, $\lambda_2$, $\lambda_3$, $\lambda_4$, taken from different pulse trains. The wavelength elements are superimposed as shown in FIG. 8E, wavelengths $\lambda_1$, $\lambda_3$, and $\lambda_4$ occurring at the same timing, and wavelength $\lambda_2$ occurring one chip later. This type of overlap, which also occurs in the first embodiment, would not be permissible in the prior art.

Figure 8F:
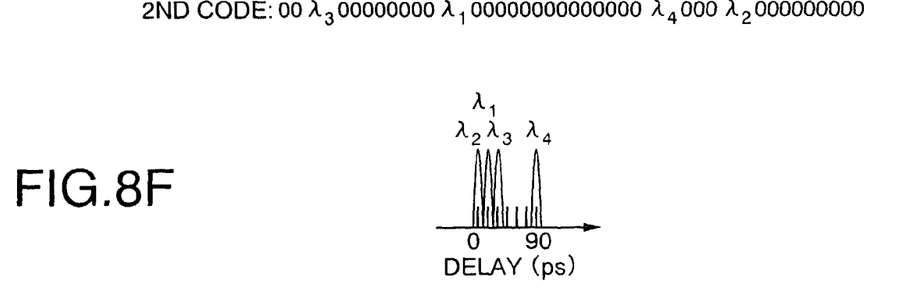
FIG. 8F shows overlapping codes in the output from the other optical encoder in FIG. 7.

The optical encoder 30A converts four successive '1' pulses in the data signal 21A from the optical modulator 20A to pulse trains that overlap as shown in FIG. 8F. Wavelengths $\lambda_2$, $\lambda_1$, $\lambda_3$, and $\lambda_4$ now occur at the first, second, third, and seventh chips in the overlapping delay groups.

When the encoded optical signals output from the two optical encoders 30, 30A are combined for multiplexed transmission, the signal shown in FIG. 8E may overlap the signal shown in FIG. 8F. If this occurs, however, no two wavelength elements having the same wavelength occur at the same timing, and the relative timing of different wavelength elements also differs between the two encoded signals. Inter-code interference is thereby avoided.

Figure 9A:
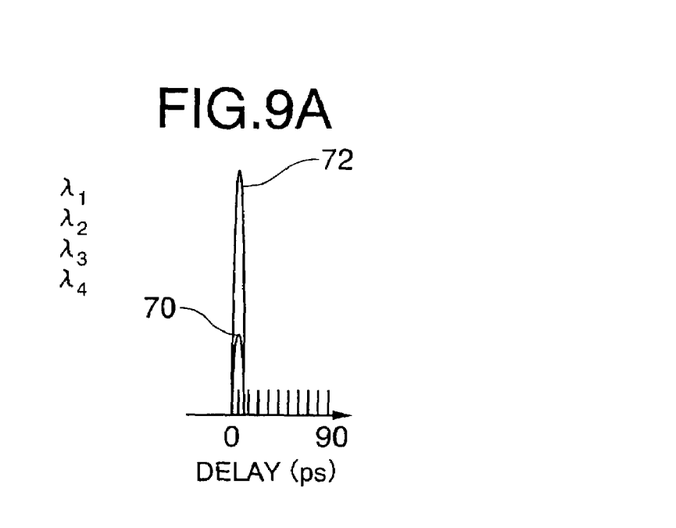
FIGS. 9A, 9B, and 9C illustrate decoding in the second embodiment.
Figure 9B:
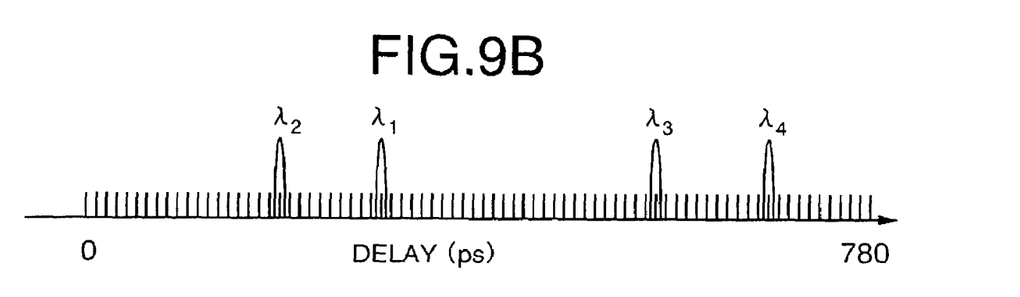
Figure 9C:
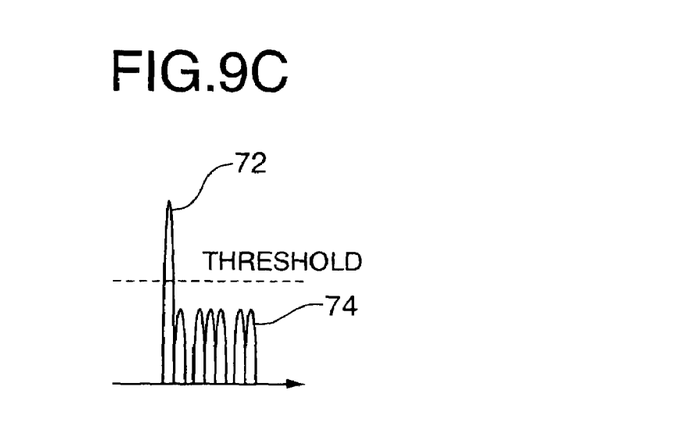

FIGS. 9A, 9B, and 9C illustrate decoding in the optical decoders 50 and 50A. When an optical pulse train encoded by the optical encoder 30 is decoded by the optical decoder 50, the four pulses 70 constituting the pulse train are aligned at the same timing, so that the optical power of the four pulses is combined into a single strong pulse 72, as shown in FIG. 9A. When the same optical pulse train, encoded by the optical encoder 30, is decoded by the optical decoder 50A, however, the four decoded pulses fail to align; they may be distributed over a time interval as long as 780 ps, as shown in FIG. 9B. Similarly, a pulse train encoded by the encoder 30A is decoded to a single strong pulse by the decoder 50A, but to a series of individually weaker pulses by the optical decoder 50. The output of the optical decoder 50 will therefore include strong pulses 72 due to the signal received from the optical encoder 30, and various weaker pulses 74 due to the signal received from encoder 30A, as shown in FIG. 9C. Similarly, the output of the optical decoder 50A will include strong pulses due to the signal from the optical encoder 30A, and weaker pulses due to the signal from the encoder 30. If a suitable threshold level is set, each receiver 62, 62A can detect the strong pulses 72, representing the desired signal, and ignore the weaker pulses 74, which constitute noise from the undesired signal.

Coding rules (1)–(6) enable the transmission rate to be increased without reducing the code length, and allow substantially complete freedom in the positioning of wavelength elements within code elements (delay groups). For these reasons, the present invention can multiplex more channels, and transmit data at higher rates in each channel, than was possible in the prior art.

Variations

The embodiments described above used a multiple-wavelength light source outputting optical pulse signals with different wavelengths, but other types of light sources may be used, such as a pulsed mode-locked semiconductor laser operating in a plurality of frequency modes, or a wideband pulsed light source.

In the embodiments described above, the optical encoder is capable of producing delays up to 3.9 times the input pulse period of the modulated optical pulse signal, but the maximum delay may be longer or shorter than 3.9 input pulse periods, provided it is longer than one input pulse period.

In the embodiments described above, a single wavelength element is disposed in each delay group (cf. FIG. 4), but as already noted, there may be delay groups with no wavelength elements, or delay groups with a plurality of wavelength elements (two, three, or more than three), provided the limitation given in coding rule (4)-a is observed. The number of delay groups can thus be set to be equal to a desired number, and the maximum is being adjusted accordingly.

In the embodiments described above, the data transmission rate of the modulated optical pulse signal is 10 Gbps, but needless to say, the optical encoding method and optical encoder of the present invention can be used for higher or lower transmission rates.

In the second embodiment, each wavelength element was placed in different delay groups in the two optical encoders 30, 30a, but the same wavelength element may be placed in the same delay group in both optical encoders 30, 30a (for example, the $\lambda_1$ wavelength element may be placed in the first delay group in both optical encoders). It suffices for the wavelength elements to occupy different chip positions in the delay group (for example, the first chip and the fifth chip).

The second embodiment described above provides a system with two optical encoders and two optical decoders sharing the same transmission path, but the number of optical encoders and optical decoders can be increased up to the maximum possible number of different codes. As described above, this maximum number is greater than in the prior art, because the maximum delay is not limited by the input pulse period, and because different wavelength elements may occupy closely adjacent chip positions, or even the same chip position, in different delay groups.

Those skilled in the art will recognize that further variations are possible within the scope of the appended claims.

What is claimed is:

1. A time-spreading and wavelength-hopping optical encoding method employing an optical encoder, said method comprising:
   receiving a modulated optical pulse signal having a predetermined pulse rate; and
   spreading each pulse in the received modulated optical pulse signal into a pulse train comprising pulses having different wavelengths and different delays, the pulse train including at least a first pulse and a last pulse, wherein said spreading comprises:
   delaying the last pulse the first pulse by an interval longer than a pulse period equal to a reciprocal of the pulse rate of the modulated optical pulse signal; and
   dividing, starting from the first pulse, the pulse train into successive delay groups equal in length to the pulse period, each pulse in the pulse train being disposed in one of the delay groups.

2. The time-spreading and wavelength-hopping optical encoding method of claim 1, wherein pulses disposed in different delay groups in the pulse train have different wavelengths.

3. The time-spreading and wavelength-hopping optical encoding method of claim 2, wherein all pulses in the pulse train have different wavelengths.

4. The time-spreading and wavelength-hopping optical encoding method of claim 2, further comprising dividing the delay groups in the pulse train into uniform intervals having a length at least equal to a pulse width of each pulse in the modulated optical pulse signal, wherein each pulse in the pulse train is disposed in one of the uniform intervals.

5. The time-spreading and wavelength-hopping optical encoding method of claim 2, further comprising:
   encoding different modulated optical pulse signals by differently structured pulse trains; and
   combining the encoded signals into a multiplexed signal, wherein a wavelength that appears at one position in a delay group of one of the differently structured pulse trains appears only in different positions in the delay groups of each other one of the differently structured pulse trains.

6. An optical encoder configured for
   receiving a modulated optical pulse signal having a predetermined pulse rate;
   wherein said optical encoder comprises gratings configured for spreading each pulse in the received modulated optical pulse signal into a pulse train comprising pulses having different wavelengths and different delays, the pulse train including at least a first pulse and a last pulse, and
   wherein said gratings are configured for spreading each pulse in the received modulated optical pulse signal into the pulse train by:
   delaying the last pulse by an interval, measured from the first pulse, longer than a pulse period equal to a reciprocal of the pulse rate of the modulated optical pulse signal; and
   dividing, starting from the first pulse, the pulse train into successive delay groups equal in length to the pulse period, each pulse in the pulse train being disposed in one of the delay groups.

7. The optical encoder of claim 6, wherein said optical encoder comprises an optical fiber, said optical fiber including, as said gratings, a plurality of chirped fiber Bragg gratings for generating the pulse train by reflecting the pulse in the modulated optical pulse signal with the different delays.

8. The optical encoder of claim 7, wherein said chirped fiber Bragg gratings that generate pulses belonging to different delay groups in the pulse train have different reflection wavelengths.

9. The optical encoder of claim 8, wherein all of said chirped fiber Bragg gratings have different reflection wavelengths.

10. The optical encoder of claim 8, wherein said chirped fiber Bragg gratings are further configured for dividing the delay groups in the pulse train into uniform intervals having a length at least equal to a pulse width of each pulse in the modulated optical pulse signal, and said chirped fiber Bragg gratings are disposed so that each pulse in the pulse train appears in one of the uniform intervals.

11. An optical multiplexing system employing a plurality of optical encoders as described in claim 8 to encode different modulated optical pulse signals, and combining the encoded signals into a multiplexed optical signal, said plurality of optical encoders each including chirped fiber Bragg gratings being configured for producing differently structured pulse trains, wherein a wavelength that appears at one position in a delay group of one of the differently structured pulse trains appears only in different positions in the delay groups of each other of the differently structured pulse trains.

* * * * *